United States Patent
Nguyen et al.

(10) Patent No.: US 7,194,621 B1
(45) Date of Patent: Mar. 20, 2007

(54) METHOD AND APPARATUS FOR ENCRYPTING DATA COMMUNICATED BETWEEN A CLIENT AND A SERVER THAT USE AN UNENCRYPTED DATA TRANSFER PROTOCOL

(75) Inventors: Khanh V. Nguyen, Milpitas, CA (US); Thomas W. Richter, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 10/086,516

(22) Filed: Feb. 28, 2002

(51) Int. Cl.
*H04L 9/00* (2006.01)
*H04L 9/12* (2006.01)

(52) U.S. Cl. .................................................. 713/162
(58) Field of Classification Search ................. 713/162
See application file for complete search history.

(56) References Cited

U.S. PATENT DOCUMENTS

| | | | | |
|---|---|---|---|---|
| 5,627,892 | A * | 5/1997 | Kauffman | 380/212 |
| 6,178,506 | B1 * | 1/2001 | Quick, Jr. | 713/168 |
| 6,215,877 | B1 * | 4/2001 | Matsumoto | 380/277 |
| 6,260,147 | B1 * | 7/2001 | Quick, Jr. | 713/182 |
| 6,480,605 | B1 * | 11/2002 | Uchiyama et al. | 380/30 |
| 6,640,305 | B2 * | 10/2003 | Kocher et al. | 713/194 |
| 6,792,280 | B1 * | 9/2004 | Hori et al. | 455/517 |
| 7,080,255 | B1 * | 7/2006 | Kasahara et al. | 713/182 |
| 2001/0010724 | A1 * | 8/2001 | Murakami | 380/286 |
| 2001/0011349 | A1 * | 8/2001 | Garrison | 713/165 |
| 2002/0199102 | A1 * | 12/2002 | Carman et al. | 713/168 |
| 2003/0093485 | A1 * | 5/2003 | Dougall et al. | 709/208 |

OTHER PUBLICATIONS

J. Franks et al. "HTTP Authentication: Basic and Digest Access Authentication" RFC 2617, Jun. 1999, pp. 1-34.*
T. Berners-Lee et al., "Hypertext Transfer Protocol—HTTP/1.0," IETF RFC 1945, May 1996.
J. Franks et al., "An Extension to HTTP: Digest Access Authentication," IETF RFC 2069, Jan. 1997.
E. Rescorla et al., "The Secure HyperText Transfer Protocol," IETF RFC 2660, Aug. 1999.

* cited by examiner

*Primary Examiner*—Nasser Moazzami
*Assistant Examiner*—Eleni Shiferaw
(74) *Attorney, Agent, or Firm*—Hickman Palermo Truong & Becker LLP

(57) ABSTRACT

Techniques for securing data in communications between a client and server using an unencrypted transfer protocol, which does not encrypt a payload defined by the transfer protocol, include selecting a subset from a set of data to be communicated in a particular payload. A secret integer is determined that is unique for the subset. Based on the subset and the secret integer, encrypted data is generated that is practically unintelligible to a device other than the client and the server. A sending device, of the client and the server, sends to a receiving device, in the particular payload, the encrypted data and information to determine, only at the client and the server, the secret integer for decrypting the encrypted data. The present techniques allow a lightweight encryption algorithm to provide authentication and data security for more secure transfer of selective portions of unencrypted payloads transferred by such protocols as the Hypertext Transfer Protocol (HTTP).

40 Claims, 8 Drawing Sheets

522
INCLUDE N IN CLUE, C

552
DETERMINE FROM CLUE, C, THE VALUE OF THE SENDER-SIDE COUNTER, NS

554
NS > N, COUNTER FOR RECEIVER ?

NO → 558

YES → 556
APPLY HASH FUNCTION H TO $H_N$ TO GENERATE HASHED INTEGER, $H_{N+1} = H(H_N)$; STORE IN SECURE DATA STRUCTURE; AND INCREMENT N

558
DETERMINE $H_{NS}$ AND $H_{NS-1}$

560
SECRET INTEGER S = $H_{NS}$ XOR $H_{NS-1}$

METHOD AND APPARATUS FOR ENCRYPTING DATA COMMUNICATED BETWEEN A CLIENT AND A SERVER THAT USE AN UNENCRYPTED DATA TRANSFER PROTOCOL

FIELD OF THE INVENTION

The present invention generally relates to cryptography in a computer network. The invention relates more specifically to a method and apparatus for encrypting data that is communicated between a client and a server that use an unencrypted transfer protocol for application-layer communications.

BACKGROUND OF THE INVENTION

Hypertext Transfer Protocol (HTTP) is widely used for communication of hypermedia documents, electronic commerce transactions, and various network management software applications. HTTP servers are now widely deployed for the purpose of transiently linking together computers that are widely geographically distributed into a virtual worldwide "web" of computers and networks. Client computers with compatible HTTP or "web" browser software can retrieve documents from HTTP servers and interact with applications that post or return results and screen displays to an HTTP server. The term "client" can refer to a process that sends a request for a service over the network as well as to the computer device that hosts the process. The term "server" can refer to a process that provides the service in response to the request, as well as to the computer device that hosts the process. As used herein, the term "client" refers to the host device for the client process unless otherwise indicated; and the term "server" refers to the host device for the server process, unless otherwise indicated.

An HTTP communication exposes the information that is communicated to many security risks, such as unauthorized access, eavesdropping, and message tampering. Several approaches are currently used to protect against such attacks through use of client passwords, authentication, and various data encryption methods.

In a first approach, HTTP Basic Access Authentication (as defined in Request for Comments 1945 ["RFC 1945"] of the Internet Engineering Task Force, available at the time of this writing at domain ietf.org) is a method that provides client authentication, but not data encryption and server authentication. In this context, "authentication" refers to verifying that a client or server is what its messages indicate it is. A further disadvantage of this approach is that any client password is sent over the network in clear text with no protection.

In another approach, HTTP Digest Access Authentication (as defined in RFC 2069, available at the time of this writing at domain ietf.org) is a method that provides an enhancement over Basic Access Authentication. The secure one-way hash function known as Message Digest 5 (or "MD5") is used to protect the password sent to a server by generating a fixed-length hash value from the password. Because the original password cannot be recovered from the MD5 hash value, this method does not work well with centralized authentication protocols, such as RADIUS or TACACS+. Use of these protocols generally involves recovering the original password so that it can be forwarded (using another encryption mechanism) to a centralized authentication server for verification.

In yet another approach, secure HTTP ("HTTPS" or HTTP over a Secure Socket Layer, SSL/TLS) is a method that provides data encryption, data integrity, and client/server authentication. HTTPS is a strong and comprehensive solution, but it requires intensive processor usage as well as significant management overhead and technical expertise to install and maintain authentication certificates. Computationally expensive bulk ciphers such as DES, Triple DES, or IDEA are used for encryption of a data stream.

The cost and overhead associated with SSL and HTTPS sometimes are not justified, especially when the data for encryption is relatively short, such as a client password, or encompasses only selected parts of the stream of communication generated by a particular application. HTTPS encryption is done in a lower logical layer than an application, typically in a socket layer; at this layer, an application cannot selectively control whether encryption is applied to data.

Based on the foregoing, there is a clear need in this field for an alternative way to improve HTTP communication security. In particular, there is a need for an approach that provides both authentication and data encryption that is more secure than the HTTP Basic method mentioned above, and that allows the destination server to decrypt the encrypted data in contrast to the Digest Access Authentication method mentioned above. There is also a need for an approach that does not require use of computationally burdensome bulk ciphers to encrypt data as used by the HTTPS method mentioned above.

It would also be desirable to have an approach that is carried out by an application on top of an HTTP transport layer, in order to allow the application to control which data is encrypted and which data is not encrypted.

There is also a specific need for an improved application-layer encryption approach that can efficiently encrypt small or medium amounts of information such as passwords, credit card numbers, user data entry, etc., under control of an application program. There is a further need for an approach that is resistant to attacks in which attackers can eavesdrop on the communication or launch a plaintext attack.

The past approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for securing data in communications between a client and server using an unencrypted transfer protocol. An unencrypted transfer protocol does not encrypt a payload defined by the transfer protocol. The method includes selecting a subset from a set of data to be communicated in a particular payload. A secret integer is determined that is unique for the subset. Based on the subset and the secret integer, encrypted data is generated that is practically unintelligible to a device other than the client and the server. A sending device sends to a receiving device, in the particular payload, the encrypted data and information to determine, only at the client and the server, the secret integer for decrypting the encrypted data.

In another aspect of the invention, a method includes receiving, from a sending device of the client and the server, a particular payload of the unencrypted transfer protocol. The particular payload includes encrypted data and information to determine, only at the client and the server, a secret integer unique for the encrypted data in the particular payload. The secret integer is determined based, at least in part, on the information. Based on the secret integer, the encrypted data is decrypted to generate a subset of data to be communicated between client and server.

In other aspects, the invention encompasses a computer apparatus and a computer readable medium, including a carrier wave, configured to carry out the foregoing steps.

Advantages accrue to the disclosed techniques in that existing methods to secure HTTP communication are either weak and inadequate, or strong and comprehensive but have high overhead costs. The solution proposed herein provides a more balanced alternative. It can provide improved security while minimizing overhead costs. It provides good protection against common types of attacks (e.g., unauthorized access, password and data eavesdropping, plain-text attacks, brute-force key search, and reverse engineering attacks). An application can control which data are to be encrypted (or not) to reduce the load on a processor. No authentication certificate is required. The techniques work with existing standard web browsers without the needs of plug-ins or other browser modifications.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5C is a flow diagram that illustrates an embodiment of another step shown in the flow diagram of FIG. 2A, which does employ a secure data structure on the client;

FIG. 5D is a flow diagram that illustrates an embodiment of a step shown in the flow diagram of FIG. 2B, which does employ a secure data structure on the client.

DETAILED DESCRIPTION OF THE PREFERRED EMBODIMENT

A method and apparatus for securing data that is communicated between a client and a server that uses an unencrypted transfer protocol for application-layer communications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OPERATIONAL CONTEXT
2.0 STRUCTURAL OVERVIEW
3.0 FUNCTIONAL OVERVIEW
4.0 ENCRYPTION APPROACHES FOR HTTP COMMUNICATIONS
    4.1 APPROACH WITH INSECURE CLIENT STATE INFORMATION
    4.2 APPROACH WITH SECURE CLIENT STATE INFORMATION
    4.3 SECURITY ANALYSIS
5.0 IMPLEMENTATION MECHANISMS -- HARDWARE OVERVIEW
6.0 EXTENSIONS AND ALTERNATIVES 1.0 Operational Context To illustrate secure data communication using an unencrypted transfer protocol, it is assumed that payloads for the Hypertext Transfer Protocol (HTTP) are generated at a web browser and web server process at an application level and are transmitted over a public network such as the Internet. However, the invention is not limited to this context. For example, the invention may also be applied to protect portions of payloads from other client processes and server processes using HTTP, or for other unencrypted transfer protocols over other insecure networks.

2.0 Structural Overview

Figure 1:
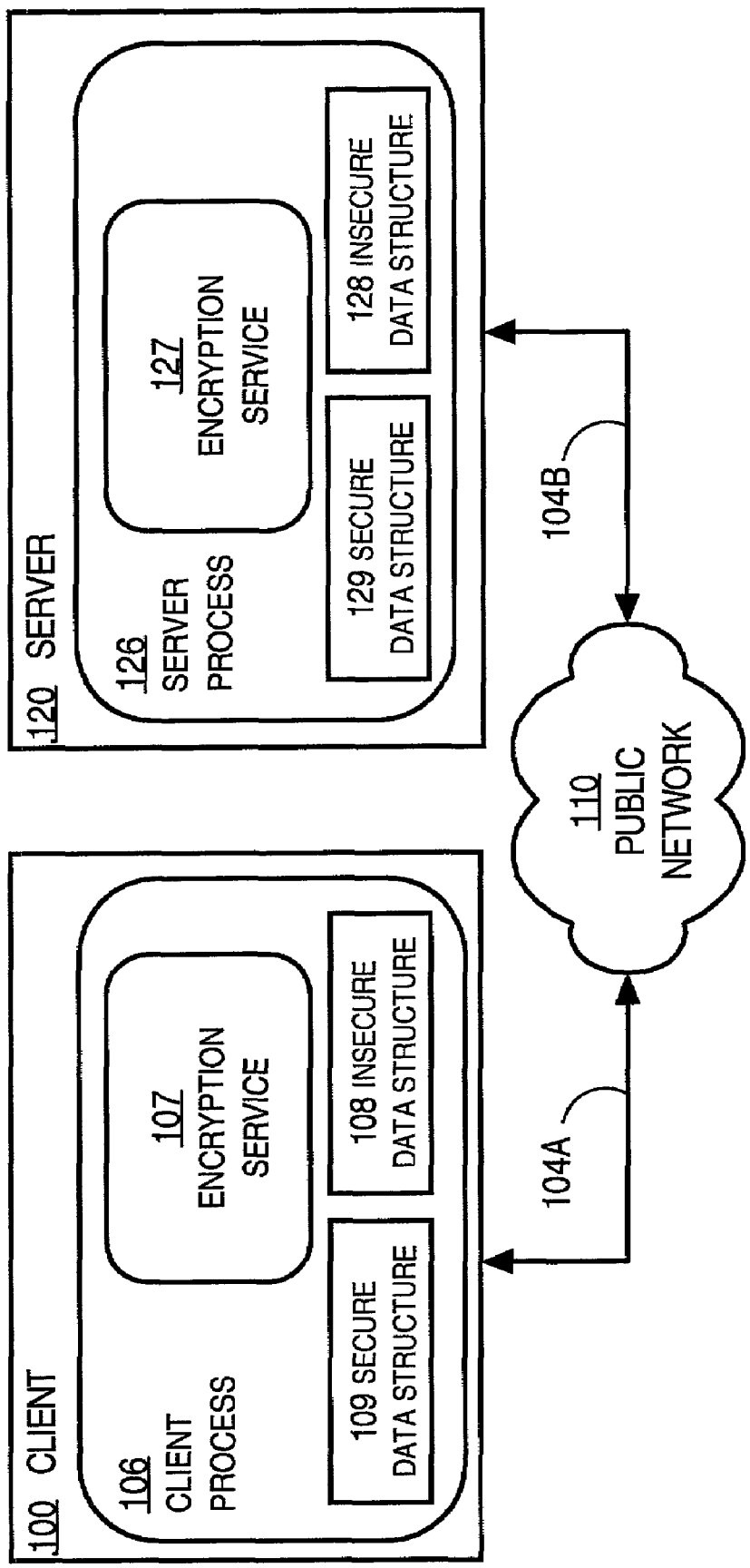
FIG. 1 is a block diagram that illustrates an overview of apparatus for securing data that is communicated between a client and a server using an unencrypted transfer protocol.

FIG. 1 is a block diagram of a hypothetical example network context in which embodiments may be implemented. A client 100 is communicatively coupled through a network 110 to a server 120 via links 104A, 104B. Client 100 is a network end station device such as a personal computer, workstation, or other processing device that hosts a client process 106. Server 120 is a processing device that hosts a server process 126 with which client process 106 interacts; in various embodiments, server 120 may be implemented as a general purpose data processing system or as a specialized data processor such as a router, switch, gateway, etc. In one example embodiment, server 120 is a network administration blade that forms a part of the Cisco Catalyst 6000 Switch, from Cisco Systems, Inc., San Jose, Calif.

Communications links 104A, 104B may be implemented by any medium or mechanism that provides for the exchange of data between client 100 and server 120. Examples of communications links 104A, 104B include, without limitation, a network such as a Local Area Network (LAN), Wide Area Network (WAN), or the Internet, or one or more terrestrial, satellite or wireless links.

In one embodiment, the client process 106 is a web application running in a web browser that can communicate using HTTP through network 110 to the server process 126 that is hosted by server 120. The web browser may be implemented as a commercial Web browser program such as Internet Explorer or Netscape Communicator. Server process 126 is any software element that provides services to client process 106; in one implementation, in which server 120 forms part of a network device such as a switch, server process 126 is a network management application for managing the network device through HTTP messages.

Client 100 includes a data storage device, such as a disk or memory, which can store program instructions and data. A Client Process 106, which is executed at client 100, stores data in one or more data structures 108, 109 in storage that is accessible to the client process. Server 120 has a data storage device that includes one or more data structures 128, 129. According to the illustrated embodiment, client process 106 may have access to a secure data structure 109 that cannot be accessed through link 104A with the network 110, or an insecure data structure 108 that can be accessed through link 104A. An example of an insecure data structure 108 is a "cookie," which is a file accessed for reading and writing through HTTP. Similarly, server process 126 stores some data in a secure data structure 129 that cannot be accessed through link 104B with the network 110, and stores some data an insecure data structure 128 that can be accessed through link 104B.

Client 100 further hosts a selective encryption and decryption process or encryption service 107, which is selectively callable by client process 106, or by an operating system of client 100, to carry out encryption and decryption functions. Although depicted as part of client process 106, the encryption service 107 may be separate from the client process 106 in other embodiments. Similarly, server 120 further hosts a selective encryption and decryption process or encryption service 127, that is selectively callable by server process 126, or by an operating system of server 120, to carry out encryption and decryption functions. Although depicted as part of server process 126, the encryption service 127 may be separate from the server process 126. Thus, encryption services 107, 127 may comprise one or more software or hardware elements that cooperate to implement the approach that is described computer functionally herein.

3.0 Functional Overview

According to the illustrated embodiments, a subset of the data to be communicated between client and server is subjected to fast encryption in which the subset is combined with a secret integer to produce encrypted data. The encryption method is selected to provide good protection against common types of attacks including unauthorized access, password and data eavesdropping, plain-text attacks, brute force key searches and reverse engineering. The encryption method is also selected to avoid the intensive computations employed by ciphers such as DES.

To avoid brute force key search attacks, a long secret key is used. For example, a 128-bit key is used. In other embodiments, a shorter key may be used; for example, a 64 bit key may be used. To avoid intensive computations, the subset of data encrypted at one time is limited to a particular size. For example, the subset to be encrypted is limited to 128 bits—sufficient to protect valuable 16-character strings or smaller, such as user passwords. Also to avoid intensive computations, the fixed length subset is combined bit by bit with a secret integer, rather than implementing computer intensive encryption algorithms that cause each bit of the subset to affect most bits of the encrypted data. An exclusive or ("XOR") operation is performed between each bit of the subset and the corresponding bit of the secret integer to produce the corresponding bit of the encrypted data.

A bit-wise XOR operation is susceptible to a plaintext attack if the same secret integer is used in multiple messages. That is, an attacker who provides or knows the subset for one message can determine the secret integer; and such an attacker can use the secret integer to decrypt subsequent encrypted data to determine subsequent subsets. For example, an attacker who is an authorized user can deduce the secret integer from the encrypted data and the attacker's own password, and then use the secret integer to determine the passwords of other authorized users. To avoid plaintext attacks, the secret integer is changed with each communication in a way that others than the client and server cannot predict. To allow the receiving device to determine the new secret integer, each message includes a clue that only the receiving device can use to determine the new secret integer.

Figure 2A:
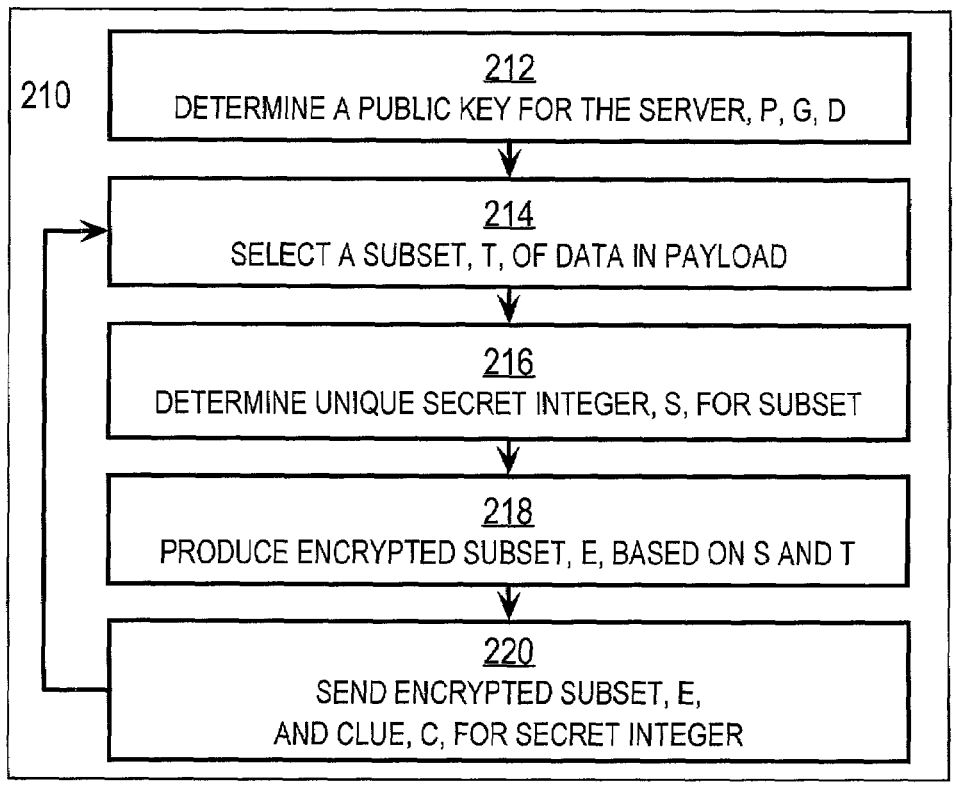
FIG. 2A is a flow diagram that illustrates a high level overview of one embodiment of a method for generating selected encrypted data to send using an unencrypted protocol.

FIG. 2A is a flow diagram that illustrates a high level overview of one embodiment 210 of a method for generating selected encrypted data to send using an unencrypted protocol. Although steps are shown in FIG. 2A and subsequent flow diagrams in a particular order, in other embodiments the steps can be performed in a different order or overlapping in time to produce the same effect.

In step 212, a sending device determines a public key for the server, P, that can be used to define a secret key, K, shared by the server and a particular client. The sending device is the device that encrypts and sends data, and it can be either the client or the server.

For example, using Diffie-Hellman key exchange (hereinafter called "D-H"), the server makes public a value of a key dimension, D, which is the maximum number of different keys that can be defined, and the value of a generator, G, used to generate public keys, where G<D. According to D-H, the server then generates a secret random number L (server's private key), and a public key P dependent on L, according to Equation 1.

$$P = G^L \bmod D \tag{1}$$

Where the symbol "mod" indicates the modulus function that provides the remainder when the value of the expression left of the symbol "mod" is divided by the modulus found to the right of the symbol "mod." When chosen according to the rules of D-H, the value of L cannot be obtained in a practical amount of time from the values of P, G and D.

Any second device, such as client 100, may use the public key of the server, P, to generate a secret key, K, which can be shared with the server. According to D-H, the client generates a secret random number M (client private key). Then Equation 2 gives the shared secret key, K.

$$K = P^M \bmod D \tag{2}$$

According to D-H, the client also determines a public key for the client, Q, using Equation 3.

$$Q = G^M \bmod D \tag{3}$$

The server does not know M and cannot compute K using Equation 2. However, the client can inform the public of the value of Q without making public the value of M. When chosen according to the rules of D-H, the value of M cannot be obtained in a practical amount of time from the values of Q, G, D. According to D-H, the server can use the public key of the client, Q, to compute K, using Equation 4.

$$K=Q^L \bmod D \quad (4)$$

Since no one else knows the value L, no other party can compute the value of K according to Equation 4, even if given the value of P and Q. Equation 2 and Equation 4, both provide the same value, K, as shown by Equation 5.

$$K=P^M \bmod D = G^{LM} \bmod D = G^{ML} \bmod D = Q^L \bmod D \quad (5).$$

For example, using at least some of the steps of D-H in step 212, the server determines the values of G, D, P. In some embodiments, the client sends an initial message to the server requesting values of G, D, P. In some embodiments, the values of G, D, P are posted to the public so that the client, and any other device that has retrieved the posting, knows these values. In yet other embodiments, the values of G and D are posted, and the client sends an initial message to the server to request the value of P. In this embodiment, upon receiving the request, the server selects a new random value, L, and generates P, and sends the value of P to the client in an initial response.

Additional steps performed in step 212 for some embodiments, incorporating additional steps of D-H, are described below with reference to FIG. 5A. The additional steps are employed in many embodiments in which the server is both the receiving and the sending device.

In step 214, a subset, represented by the symbol T, of the data in the HTTP payload is selected for encryption at the sending device. For example, a script included in a Hypertext Markup Language (HTML) page is communicated to the client by the server via HTTP and is executed by a web browser on the client. The script causes the web browser to prompt a user for a password, among other data, and selects the password for encryption.

In some embodiments, a separate process, such as a Java applet, is provided to the client by the server and is launched by the web browser. The Java applet prompts the user for the password and selects the password for encryption, returning the encrypted data and clue, as described in more detail below, to the web browser for incorporation into the next request from client to server. Thus, using scripts or applets, a web application can select a subset for encryption and employ other processes of the encryption service 107 without reliance on a browser plug-in module. In other embodiments, a new plug-in module is developed for a web browser or other client process to select the subset for encryption and to invoke the other processes of the encryption services 107.

In some embodiments, the server is also the sending device, and the data to be encrypted is selected by a server. For example, the server may generate a password for subsequent use by a client, and select the generated password to be encrypted.

In step 216 a unique secret integer S, based at least in part on a shared secret key, K, is determined to use for encrypting the subset, T. The shared secret key, K, is based in part on the server's public key P. To avoid plaintext attacks, S is unique for every communication. For example, a different value of S is used for each HTTP payload sent from the sending device.

Figure 4A:
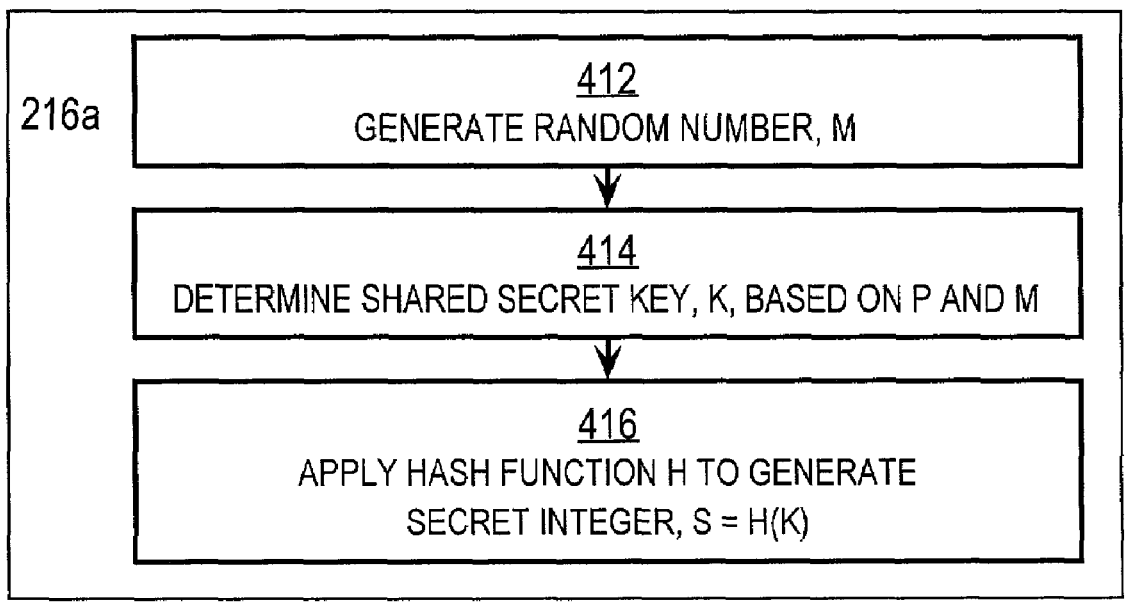
FIG. 4A is a flow diagram that illustrates an embodiment of a step shown in the flow diagram of FIG. 2A, which does not employ a secure data structure on the client.

Additional steps performed in step 212 for different embodiments are described below with reference to FIG. 4A and FIG. 5B. In the embodiment of FIG. 4A, for example, a different value of the random number M, generated by the client for each payload, is used to produce a different value of K for each payload, and thus S, derived from K, is different for each payload. In the embodiment of FIG. 5B, for example, a single value of K is hashed using a one-way hash function a different number of times for each payload, and S is derived from the last output of the hash function.

In step 218, the secret integer, S, and the subset, T, are combined to produce encrypted data, E. For example, a bit-wise XOR is performed on the subset, T, and the secret integer, S, to generate the encrypted data E.

In step 220 the encrypted data E and a clue, represented by the symbol C, for determining the secret integer, S, at the receiving device, are included in the HTTP payload for transmission to the receiving device. Additional steps performed in step 220 for different embodiments are described below with reference to FIG. 4B and FIG. 5C. For example, in the embodiment of FIG. 4B, the public key of the client, Q, is included in C. In the embodiment of FIG. 5C, the number of times the hash function is applied, represented by the symbol N, is included in the clue C.

Control may eventually return to step 214 to process the next subset or payload to be sent to the same receiving device.

Figure 3:
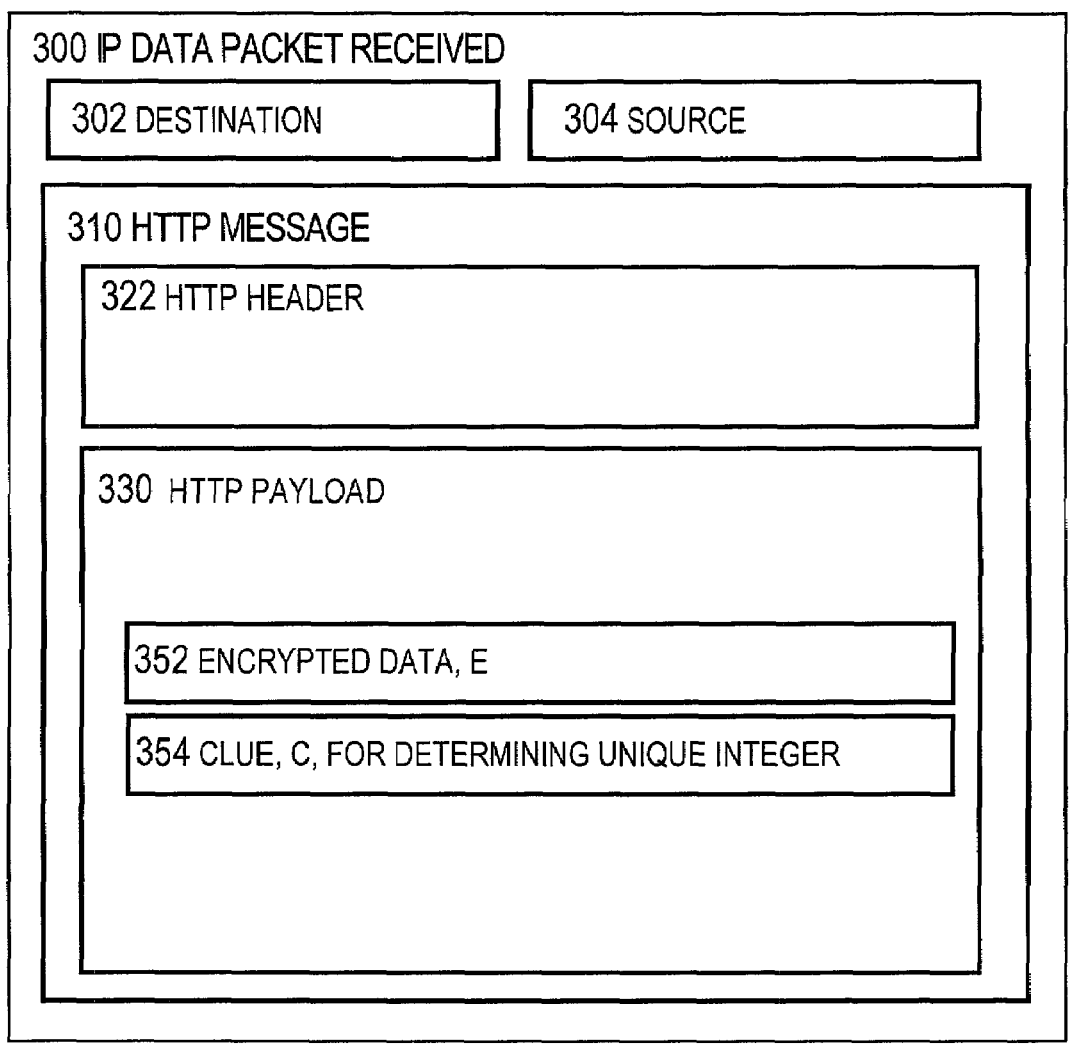
FIG. 3 is a block diagram of a data packet for an HTTP message with encrypted data.

FIG. 3 is a block diagram of a data packet 300 for an HTTP message with encrypted data, according to an embodiment. The illustrated data packet 300 is a data packet formatted according to the Internet Protocol (IP) in the networking layer used by networking hardware to forward data packets over the Internet and similar networks. For simplicity, FIG. 3 illustrates one packet 300; however, long HTTP messages may require many more than one packet. Thus, in the description below, references to packet 300 should be understood to include multiple packets, a packet stream, etc.

The IP packet 300 includes a destination network address in a destination field 302 and a source network address in a source field 304, among other fields. Within the IP packet 300 is an HTTP message 310 for use in communications between the server process 126 and the client process 106 at the application layer. The HTTP message includes an HTTP header 322 and an HTTP payload 330. Neither the HTTP header 322 nor the HTTP payload 330 is encrypted. In the HTTPS protocol, the entire message 310 is encrypted.

According to the illustrated embodiment, the HTTP payload 330 includes a fixed length encrypted data field 352 for holding E, the encrypted data for a selected subset. The payload 330 also includes a clue field 354 for holding data indicating the clue C for determining the secret integer S at the receiving device. For example, in the embodiment described in more detail below with reference to FIG. 4A, the clue field includes data indicating Q, the public key of the client for the unique value of K, the shared secret key, employed for the subset in payload 330 of a particular data packet. In the embodiment described in more detail below with reference to FIG. 5B, the clue field includes data indicating N, the number of times the hash function is applied for producing the encrypted data in payload 330 of a particular data packet.

Figure 2B:
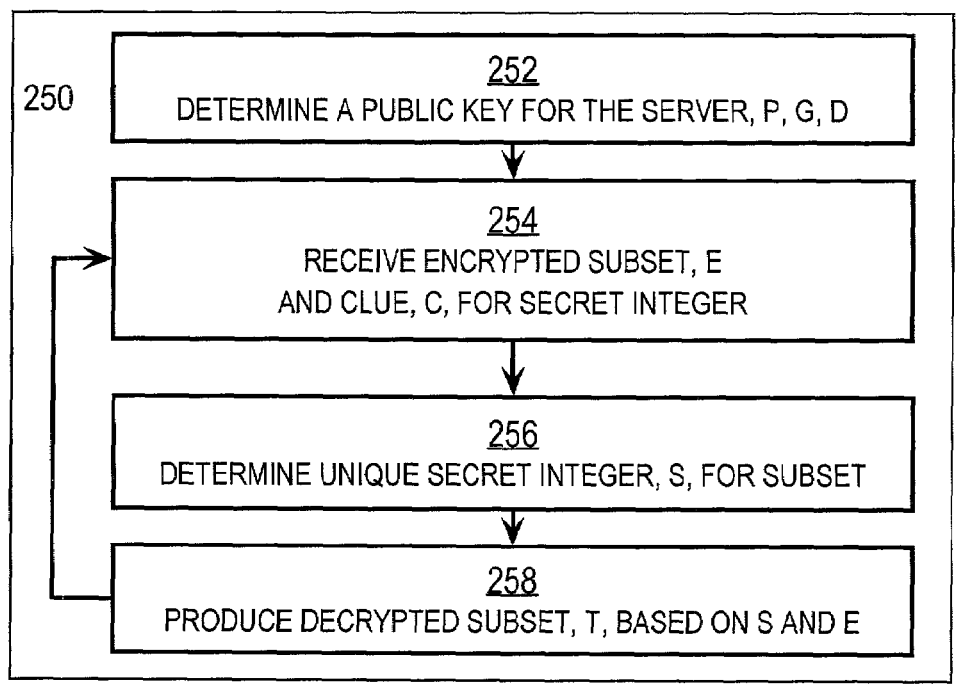
FIG. 2B is a flow diagram that illustrates a high level overview of one embodiment of a method for processing selected encrypted data received using an unencrypted protocol.

FIG. 2B is a flow diagram that illustrates a high level overview of embodiment 250 of a method for processing selected encrypted data that is received using an unencrypted protocol, such as HTTP.

In step 252, the receiving device determines a public key for the server P. Step 252 corresponds, for the receiving device, to step 212 for the sending device. Additional steps performed in step 252 for some embodiments, incorporating additional steps of D-H, are described below with respect to FIG. 5A. The additional steps are employed in some embodiments in which the server is the receiving device, and may also be a sending device for a different HTTP payload.

In step 254, the receiving device receives E, the encrypted data, and C, the clue for determining the secret integer. For example, the receiving device receives the data packet 300 that includes the HTTP payload 330 that includes the encrypted data field 352 and the clue field 354.

In step 256, the receiving device determines S, the secret integer unique for the subset encrypted in the payload, based on C, the clue. Additional steps performed in step 256 for different embodiments are described below with reference to FIG. 4C and FIG. 5D. For example, in the embodiment of FIG. 4C, the secret integer S is computed based on Q, the public key of the client, included in C, the clue. In the embodiment of FIG. 5D, the secret integer S is computed based on N, the number of times the hash function is applied to a shared secret key determined in an earlier communication, which number N is included in C, the clue.

In step 258, the receiving device combines S, the secret integer, and E, the encrypted data to produce T, the selected subset in plaintext. For example, a bit-wise XOR is performed on S and E to generate T, such as a password.

Control may eventually return to step 254 to process the next payload received that includes values of E and C from the same sending device.

4.0 Encryption Approaches for Http Communications

Two approaches for encrypting data that is communicated between a client and a server using HTTP for application-layer communications are now described. A first approach is suited to client processes that cannot maintain client state information securely, such as web browsers that store state information in cookies. The second approach is useful in conjunction with client processes that can store state information securely, such as Java applets that can be launched by many current web browsers. The first approach is used for one-way encrypted communications from client to server. The second approach can be used for two-way encrypted communications between the client and server; and consumes fewer computations per payload after an initial payload is communicated.

4.1 Approach with Insecure Client State Information

Embodiments of the first approach support encryption of data in one logical direction, from client to server. Upon the initiation of process 212 and 252 of FIG. 2A and FIG. 2B, respectively, it is assumed that client 100 and server 120 each store the generator value G and the modulus value D in data structures 108, 128, respectively. The embodiments of the first approach described herein do not require storage of generator value G and modulus value D in a secure manner.

In embodiments of step 212 using the first approach, the client process 106 on client 100 sends an initial request to server process 126 on server 120. The initial request may be conveyed from client 100 to server 120 in the form of an HTTP request in an IP packet. Encryption process 127 on server 120 generates a large secret number L (server's private key), calculates the server's public key value P according to Equation 1, and passes the value of P to the server process 126 which sends the server's public key value P to the client process 106 on client 100. The encryption process 127 stores the value of L in secure data structure 129 for use with subsequent communications from client 100. Upon receiving the public key value P, the encryption service 107 on client 100 stores P in the insecure data structure 108, such as in a browser cookie file.

In embodiments of step 214 using the first approach, the client process 106 determines a data subset T to be encrypted, which is a subset of an HTTP payload to be sent to server 120. The client process passes the subset T to the encryption service 107 for encrypting. For purposes of illustration, it is assumed that the client process 106 selects a user-entered 8-character password as the subset T to encrypt.

In first approach embodiments of step 216, the encryption service 107 on client 100 determines S, the secret integer unique for the subset T, according to the more detailed steps depicted in FIG. 4A. FIG. 4A is a flow diagram that illustrates embodiment 216a of step 216.

In step 412, the encryption service 107 on client 100 uses a secure random generator to generate the random number M. For example, encryption service 107 uses the Blum, Blum, Shub (BBS) random bit generator, well known in the art, to generate a value of M that cannot be predicted from a previous value of M.

In step 414, the encryption service 107 on client 100 determines the shared secret key, K, based on the server's public key, P, and based on the random number M. For example, the encryption service 107 applies Equation 2 of D-H, shown above.

In step 416, the encryption service 107 applies a secure one-way hash function to K to generate S, the secret integer. With a secure, one-way hash function, the input cannot be determined based on knowledge of the output. Example secure hash functions include the Secure Hash Algorithm (SHA), and compression function called Message Digest 5 (MD5), well known in the art.

It is assumed that the hash function produces an output with s bits (i.e., $S<2^s$) and the modulus D has d bits (i.e., $D=2^d$). Using a one-way hash function, it is not required that s equal d. For the purposes of illustration, it is assumed that the MD5 function is employed with. s=128 while d=64. The value of s is selected as 128 because the MD5 function generates a 128-bit output. The value of d is selected as 64 for performance reasons; larger values may be used for greater security, but require additional computation time. The value of S is therefore computed according to Equation 6.

$$S=md5(K) \qquad (6),$$

where the symbol "md5" represents the MD5 hash function. In some embodiments, to generate S that is longer than 128 bits (s>128), MD5 function can be applied multiple times to the original K.

In some embodiments, step 416 is omitted; and S is set equal to K.

In embodiments of step 218 using the first approach, the encryption service 107 performs a bit-wise XOR of the secret integer S and the subset T to obtain encrypted data E, according to Equation 7.

$$E=T \text{ XOR } S \qquad (7).$$

For example, a login password and the secret integer S are combined with a bit-wise XOR operation. The encryption service 107 passes the value of E to the client process 106.

Figure 4B:
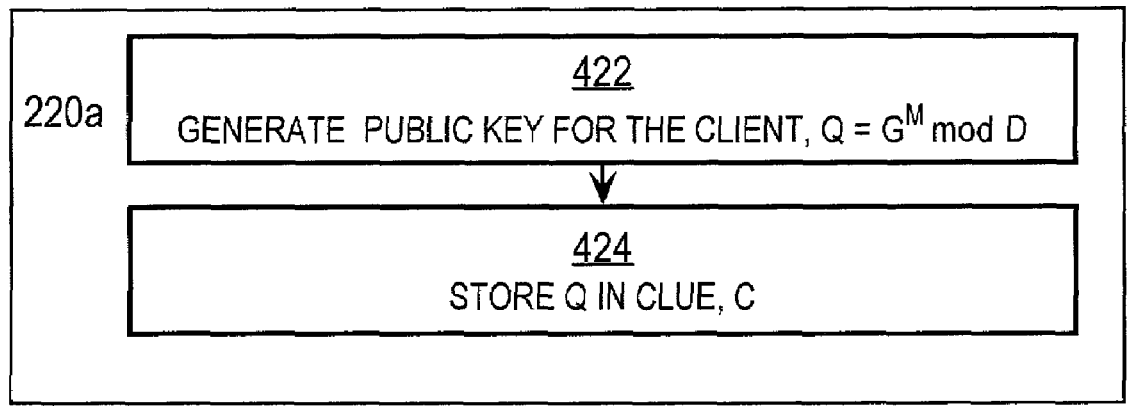
FIG. 4B is a flow diagram that illustrates an embodiment of another step shown in the flow diagram of FIG. 2A, which does not employ a secure data structure on the client.

In first approach embodiments of step 220, the client 100 sends a data packet that includes a payload with E, the encrypted data, and C, the clue, according to the more detailed steps depicted in FIG. 4B. FIG. 4B is a flow diagram that illustrates embodiment 220a of step 220.

In step 422, the encryption service 107 calculates Q, the client public key according to D-H, using Equation 3, shown above. The value of Q is included in C, the clue, and C is passed to the client process 106.

In step 424, the client process 106 stores the value of C, the clue, in the clue field 354 of the HTTP payload 330. The client process 106 also includes the value of E, the encrypted data, in the encrypted data field 352 of the HTTP payload 330.

In first approach embodiments of step 254, the data packet 300 with the HTTP payload 330 is received at the server 120. In some embodiments of step 254, the encryption service 127 on the server 120 receives the packet 300 and extracts the data from the encrypted data field 352 and the clue field 354 that indicate the values of E and C. In some embodiments of step 254, the server process 126 receives the HTTP payload 330, extracts values of E and C from fields 352, 354, respectively, and passes those values to the encryption service 127.

Figure 4C:
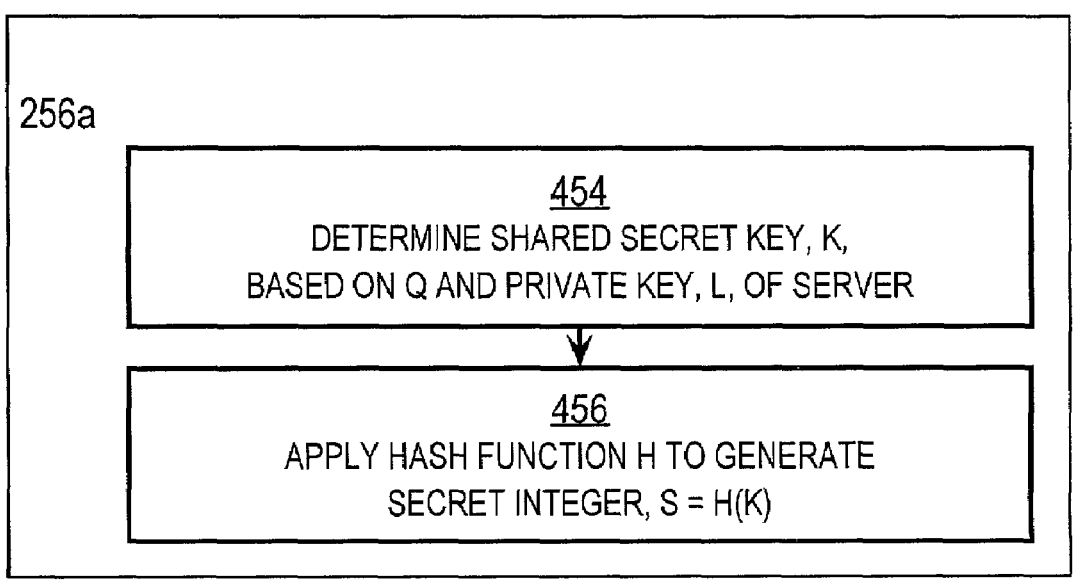
FIG. 4C is a flow diagram that illustrates an embodiment of a step shown in the flow diagram of FIG. 2B, which does not employ a secure data structure on the client.

In first approach embodiments of step 256, the encryption service 127 on server 120 determines the value of S, the secret integer, based on the value of C, according to the more detailed steps depicted in FIG. 4C. FIG. 4C is a flow diagram that illustrates embodiment 256a of step 256.

In step 454, the server determines K, the shared secret key, based on Q, the client public key, indicated by C, the clue. For example, the encryption service 127 sets Q equal to C and computes K according to D-H, using Equation 4, shown above.

In step 456, the hash function (which must be the same function as the one that is used in step 416) is applied to the value of K to generate the value of S, the secret integer. For example, the encryption service 127 computes S using Equation 6. In some embodiments, step 456 is omitted; and S is set equal to K.

In embodiments of step 258, the server does a bit-wise XOR of the secret integer S and the encrypted data E to obtain subset, T, according to Equation 8.

$$T = E \; XOR \; S \qquad (8).$$

For example, the encryption service 127 on server 120 combines E, the encrypted data, and the secret integer S, computed in step 256a, with a bit-wise XOR operation to produce the login password. In this embodiment, the value of T is then passed from the encryption service 127 to the server process 126. For example, the value of the user's login password is passed to the server process 126 for further processing.

4.2 Approach with Secure Client State Information

The second approach supports encryption of data in both logical directions, from client to server and from server to client. For multiple payloads, embodiments using the second approach are much faster than the embodiments using the first approach. Embodiments using the second approach have the client maintain secret state information, such as a value of the shared secret key, K, in a secure data structure 109. For example, a secure data structure includes a variable in a Java applet, but does not include a cookie file. In the embodiments of the second approach, a single value of K, stored in the secure data structures 109, 129, is hashed using a one-way hash function a different number of times for each payload, and S is derived from the last output of the hash function.

As in embodiments using the first approach, upon the initiation of process 212 and 252 of FIG. 2A and FIG. 2B, respectively, it is assumed that client 100 and server 120 each store the generator value G and the modulus value D in data structures 108, 128, respectively. The approach herein does not require storage of generator value G and modulus value D in a secure manner, such as in secure data structures 109, 129.

Figure 5A:
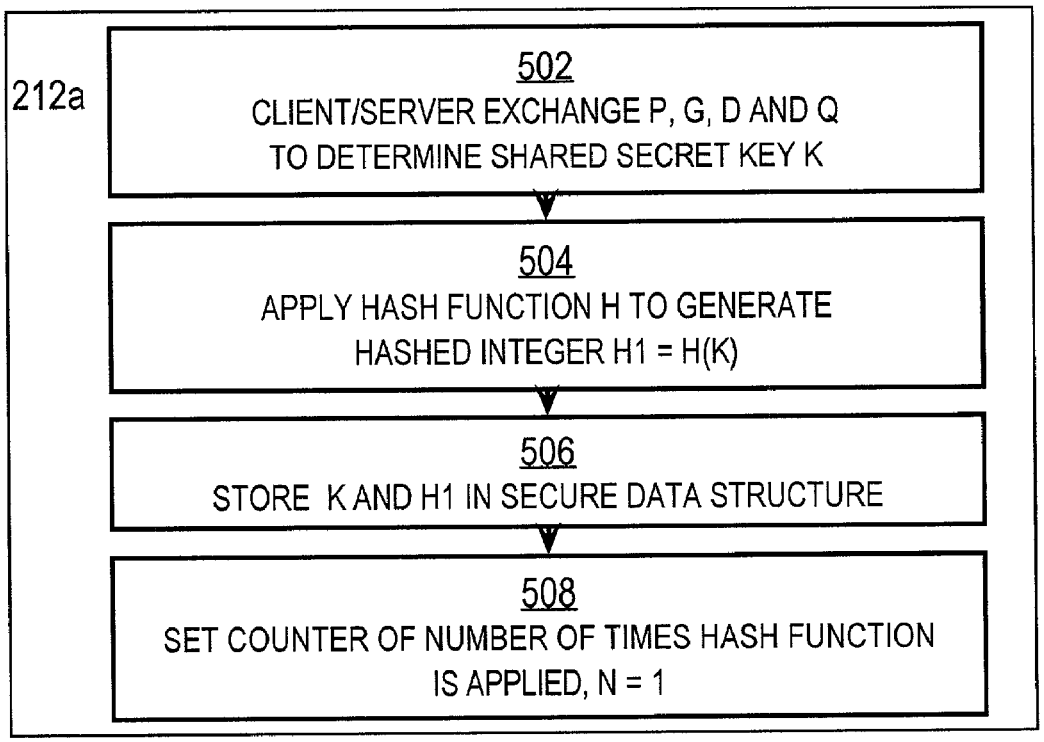
FIG. 5A is a flow diagram that illustrates an embodiment of a step shown in the flow diagram of FIG. 2A, which does employ a secure data structure on the client.
Figure 5B:
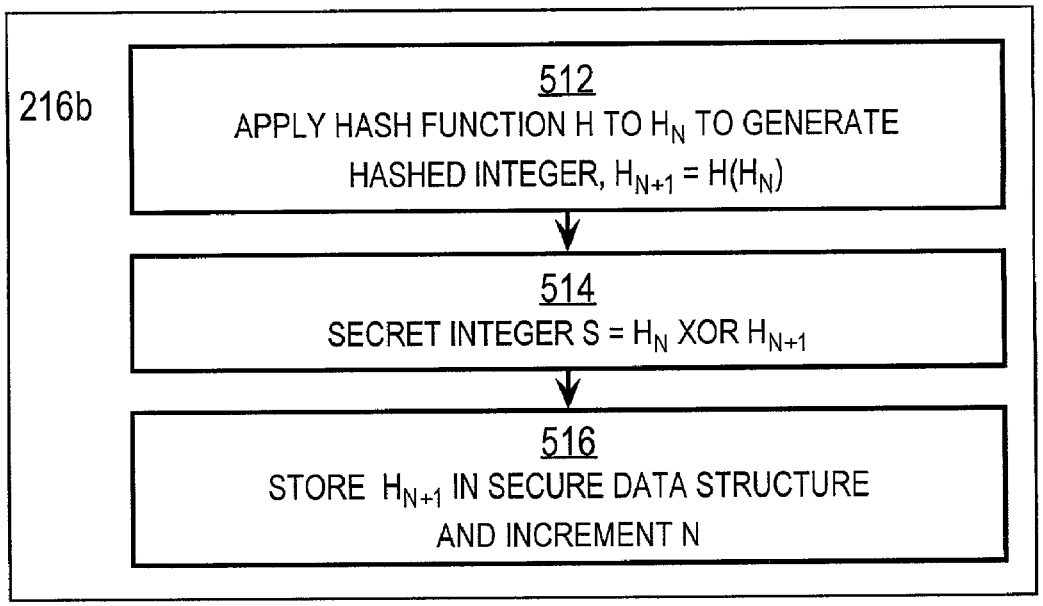
FIG. 5B is a flow diagram that illustrates an embodiment of another step shown in the flow diagram of FIG. 2A, which does employ a secure data structure on the client.

In embodiments of step 212 using the second approach, P, the server's public key is determined according to the more detailed steps depicted in FIG. 5A. FIG. 5A is a flow diagram that illustrates embodiment 212a of step 212.

In step 502, the client and server exchange K, the shared secret key. For example, K is determined according to D-H using the following steps. The client process 106 on client 100 sends an initial request to server process 126 on server 120. The initial request may be conveyed from client 100 to server 120 in the form of an HTTP request. Encryption process 127 on server 120 generates the large secret number L (server's private key), calculates the server's public key value P according to Equation 1, and passes the value of P to the server process 126 which sends the server's public key value P to the client process 106 on client 100. The encryption service 127 stores the value of L in secure data structure 129 for use later to compute the shared secret key K.

Upon receiving the public key value P, the encryption service 107 on client 100 stores P in the insecure data structure 108, such as in a browser cookie file. The encryption service 107 on client 100 determines a random number M, using a random number generator such as the BBS generator, and computes both K, the shared secret key, and Q, the client's public key, using Equation 2 and Equation 3, respectively.

The value of Q is included in at least one subsequent HTTP payload sent to the server 120. For example, in some embodiments, the value of Q is included alone in the clue, C, in a payload sent to the server with a particular message, herein called a "follow-up message." In such embodiments, the server 120 computes the shared secret key K using equation 4 and stores it in the secure data structure 129 on server 120 when the follow-up message is received.

In some embodiments, the value of Q is included in at least one (usually the first) of the payloads sent to the server in step 220, described in more detail below with reference to FIG. 5C. In such embodiments, the clue, C, in the clue field 354 of the particular message that includes the value of Q, also includes other data used to determine the secret key for the subset included in that particular message. Messages other than the particular message may omit the value of Q from the clue, C. When the server 120 receives the particular message, the server 120 retrieves the value of Q included in C, retrieves the value of L from secure data structure 129, and computes K using Equation 4. For example, server process 126 passes C to encryption service 127, which retrieves the value of Q and computes K.

In some embodiments, the same value of K is used for communications from client to server and for communications from server to client. In other embodiments, one shared secret, K1, is used for communications from client to server, and a different shared secret, K2, is used for communications from server to client. For purposes of describing a simple example, it is assumed that the same value of K is used for communications to and from the client and server.

Embodiment 212a includes additional steps, 504, 506, 508. In step 504, a hash function is applied to K, the shared secret key, to generate a first hashed integer, $H_1$. $H_1$ is used to generate the secret integer, S, as described in more detail below with reference to FIG. 5B. For example, an encryption service, 107, 127, applies the MD5 hash function to the value of K according to Equation 9.

$$H_1 = md5(K) \qquad (9).$$

In some embodiments, the same hash function is used for communications from client to server and for communications from server to client. In other embodiments, one hash function is used for communications from client to server, and a different hash function is used for communications from server to client. For purposes of describing a simple example, it is assumed that the same hash function is used for communications to and from the client and server.

In step 506, the values of K and $H_1$ are stored in a secure data structure. For example, the encryption service 107 on client 100 stores the values of K and $H_1$ in secure data structure 109 on client 100; and the encryption service 127 on server 120 stores K and $H_1$ in the secure data structure 129 on server 120.

In step 508, a counter, represented by the symbol N, is set to the number of times the hash function has been applied. The value of N is used in following steps in C, the clue to indicate the secret integer S to the other communicating party. The value of N can be stored in an insecure data structure. For purposes of illustration, it is assumed to be convenient to store the value of N in the secure data structure 109, 129, with the value for $H_1$. For example, N is set to 1 by the encryption service 107 on client 100 and stored in secure data structure 109; and N is set to 1 by the encryption service 127 on server 120 and stored in secure data structure 129.

In some embodiments, the same counter is used for communications from client to server and for communications from server to client. In other embodiments, one counter is used for communications from client to server, and a different counter is used for communications from server to client. For purposes of illustration, it is assumed that the same counter is used for communications to and from the client and server.

In second approach embodiments of step 214, a sending device, of the client 100 and server 120, determines a subset T to be encrypted; the subset is of an HTTP payload to be sent to a receiving device, of the client 100 and server 120. For purposes of illustration, it is assumed that the client is the sending device, and the client process 106 selects a user-generated 8-character password as the subset T to encrypt. The client process 106 passes T to the encryption service 107.

In step 216, the sending device determines S, the secret integer. For example, encryption service 107 on client 100 determines S, the secret integer unique for the subset T, according to the more detailed steps depicted in FIG. 5B. FIG. 5B is a flow diagram that illustrates embodiment 216b of step 216.

In step 512, the hash function is applied to the most recent value of the hashed integer, represented by the symbol $H_N$, where N indicates the current value of the counter N. A value for $H_{N+1}$ is produced. For example, the encryption service 107 on client 100 uses the MD5 hash function to generate $H_{N+1}$ according to Equation 10.

$$H_{N+1}=md5(H_N) \qquad (10).$$

In some embodiments, for purposes of increasing the security of the system, the hash function is applied more than once during step 512 to generate $H_{N+2}$ or more hashed integers. In some embodiments, each additional hash function applied during step 512 is a different type of hash function. For purposes of illustration, it is assumed that the particular MD5 hash function is applied only once during step 512 and no other hash function is applied.

In step 514, two values of the hashed integer are combined using a bit-wise XOR operation. Any two values of the hashed integer may be used, provided that the combination is different than used by any previous subset, and provided that the values are available in the secure data structure. For purposes of illustration, it is assumed that only the two most recent values of the hashed integer, $H_N$ and $H_{N+1}$, are stored in the secure data structure. Since $H_{N+1}$ is newly computed, the combination is expected to be unique. For example, the encryption service 107 on client 100 computes S according to Equation 11.

$$S=H_N \text{ XOR } H_{N+1} \qquad (11).$$

Two values of the hashed integer are combined to prevent plaintext attacks. If a single hashed integer, $H_N$, were used, a plaintext attacker could determine the value of $H_N$ and could then generate $H_{N+1}$ and subsequent hashed integers using the well known MD5 hash function. By using two hashed integers combined, the plaintext attacker can only recover the combination. Because the combination is not used as input to the MD5 hash function, the attacker cannot compute the next value of the hashed integer and cannot compute the next value of S.

In step 516, the value of $H_{N+1}$ is stored in the secure data structure and the counter is incremented. For example, the encryption service 107 on client 100 stores the value of $H_{N+1}$ in secure data structure 109, dropping the value of $H_{N-1}$ from the data structure 109; and the encryption service 107 also increments the counter N. For purposes of illustration, it is assumed that N=1 at the beginning of step 516, but any initial value may be used, as long as the client and the server use the same initial value. $H_1$ is already stored in the secure data structure 109 as a result of step 506, above. During step 516, $H_2$ is stored in secure data structure, N is incremented to 2, and the value of N=2 is stored in the secure data structure 109.

In second approach embodiments of step 218, the sending device encrypts the text message T based on the secret integer S computed in step 514. For example, encryption service 107 does a bit-wise XOR of the secret integer S and the subset T to obtain encrypted data E, according to Equation 7, as described above for the embodiments of the first approach. In the illustrated example, the login password and the secret integer S are combined with a bit-wise XOR operation.

In second approach embodiments of step 220, the sending device sends a data packet that includes a payload with E, the encrypted data, and C, the clue, according to the more detailed steps depicted in FIG. 5C. FIG. 5C is a flow diagram that illustrates embodiment 220b of step 220.

In step 522, the sending device includes the value of N in the clue C. If the message being generated is the particular message from client to server, which also includes a value of Q, then the value of Q is also included in the clue C. For example, the encryption service 107 on client 100 includes the value of N in the clue C. If the value of Q has not yet been sent to the server, the value of Q is also included in C. The value of C is passed to the client process 106.

In second approach embodiments of step 254, the data packet 300 with the HTTP payload 330 is received at the receiving device. In some embodiments of step 254, the encryption service 107, 127 on the receiving device receives the packet 300 and extracts the data from the encrypted data field 352 and the clue field 354 that indicate the values of E and C, respectively. In some embodiments of step 254, the process 106, 126 receives the HTTP payload 330, extracts values of E and C from fields 352, 354, respectively, and passes those values to the encryption services 107, 127, respectively.

In embodiments of step 256 for the second approach, the encryption service 107, 127 on the receiving device determines the value of S, the secret integer, based on the value of C, according to the more detailed steps depicted in FIG. 5D. FIG. 5D is a flow diagram that illustrates embodiment 256b of step 256.

In step 552, the receiving device determines, from C, the value of NS, the counter on the sending device. For example, the encryption service 127 on server 120 retrieves the value of NS from C. It is assumed for purposes of illustration that NS has a value of 2, while the counter N on the receiving server has a value of 1.

In step 554, it is determined whether NS is greater than N. If so, the hashed integer on the receiving device should be hashed one or more times to bring the counters on the communicating devices into synchronization. If not, then some problem is indicated. For example, the sending device might have incorrectly reset its counter. As an alternative example, the sending device might have missed some previous response messages from the receiving device. If NS is less than or equal to N, the hashed integers for computing the value of S that was used by the sending device have already been computed on the receiving device and might be stored in the secure data structure. If NS is too small, the hashed integers used in computing S might no longer be stored in the secure data structure.

If it is determined in step 554 that NS is greater than N, control passes to step 556. In step 556, the hash function is applied to the current value of $H_N$ to compute $H_{N+1}$; $H_{N+1}$ is stored in the secure data structure. In some embodiments, the value of $H_{N-1}$ is removed from the secure data structure. Then N is incremented. Control passes back to step 554 to determine whether the hash function should be applied again to achieve synchronization.

For example, when NS=2 and N=1, control passes to step 556 and the encryption service 127 on the receiving server 120 computes $H_2$ by applying the hash function to $H_1$ and then increments N to N=2. Control passes back to step 554 to see if the hash function should be applied again to achieve synchronization. This time NS=N and control passes to step 558.

If it is determined in step 554 that NS=N, or NS<N, control passes to step 558. In step 558, the values of $H_{NS}$ and $H_{NS-1}$ are determined. If those values are in the secure data structure, the values are retrieved. If not, the values are recomputed by retrieving the value of the secret key, K, and hashing it NS times; re-computing from the value of K is undesirable because it consumes more computational resources than retrieving values already computed. Control then passes to step 560. Alternatively, in some embodiments, if NS<N, the receiver can choose to abort the communication session as this indicates some problematic condition.

In step 560, the value of the secret integer S used by the sending device is determined according to Equation 12.

$$S = H_{NS-1} \text{ XOR } H_{NS} \qquad (12).$$

For example, when NS=2, the encryption service 127 on the receiving server 120 determines that the value of S is $H_1$ XOR $H_2$.

In an embodiment of step 258 in the second approach, the server does a bit-wise XOR of the secret integer S and the encrypted data E to obtain subset T, according to Equation 8, above. For example, the encryption service 127 on server 120 combines E, the encrypted data, and the secret integer S, computed in step 256b, with a bit-wise XOR operation to produce the login password. In this embodiment, the value of T is then passed from the encryption service 127 to the server process 126. For example, the value of the user's login password is passed to the server process 126 for further processing.

4.3 Security Analysis

This section is provided to help a reader understand and benefit from the steps taken in the above embodiments. However, the invention is not limited by this analysis or by the features of the mechanisms proposed to explain the steps or by any theories expressed.

In both approaches, D-H is relied upon to establish one or more common secret keys, K, between client and server. D-H is vulnerable to active attacks, such as a man-in-the-middle attack, well known in the art. However, to passive attackers, which can only sniff network traffic but cannot alter the contents and directions of the packet streams, the only known way to determine the secret key is exhaustive search. Even with a relatively small key size (64 bits), an exhaustive search is expected to take a very long time.

Both methods use XOR to encrypt text T. Therefore, some mechanism to prevent plaintext attacks is appropriate. If an attacker has knowledge about one plaintext message (e.g., the attacker's own password), the attacker can use the known plaintext, T, and the encrypted data, E, to figure out the encryption integer, S. For example:

$$E = T \text{ XOR } S \Longrightarrow S = T \text{ XOR } E.$$

In the first approach, a new secret key K is used for each encryption, and a different value for S=md5(K) is obtained for each payload. Therefore, even if a plaintext attacker can get the secret S of one message, the attacker cannot use the captured secret to decrypt other messages. In the second approach, a single shared secret key K is used for the whole session; but the use of two hashed integers effectively prevents plaintext attacks. If an attacker knows T and E (T XOR $H_N$ XOR $H_{N+1}$), then the attacker can determine ($H_N$ XOR $H_{N+1}$), but not $H_N$ or $H_{N+1}$ individually. Thus, the attacker cannot figure out the future hashed integers. For example, although the attacker may also know that $H_{N+1}$=md5($H_N$), that information does not help much, because currently there is no known way to find a value x given the quantity (x XOR md5(x)) except to perform a brute-force search.

The first approach stores the server's public key P in a browser cookie. This is not a security risk because P is not a secret. The second approach relies on the secret key K and $H_N$, $H_{N+1}$ being stored in some secure place, such as inside an applet or some client storage that is not accessible from the public network.

4.0 Implementation Mechanisms—Hardware Overview

Figure 6:
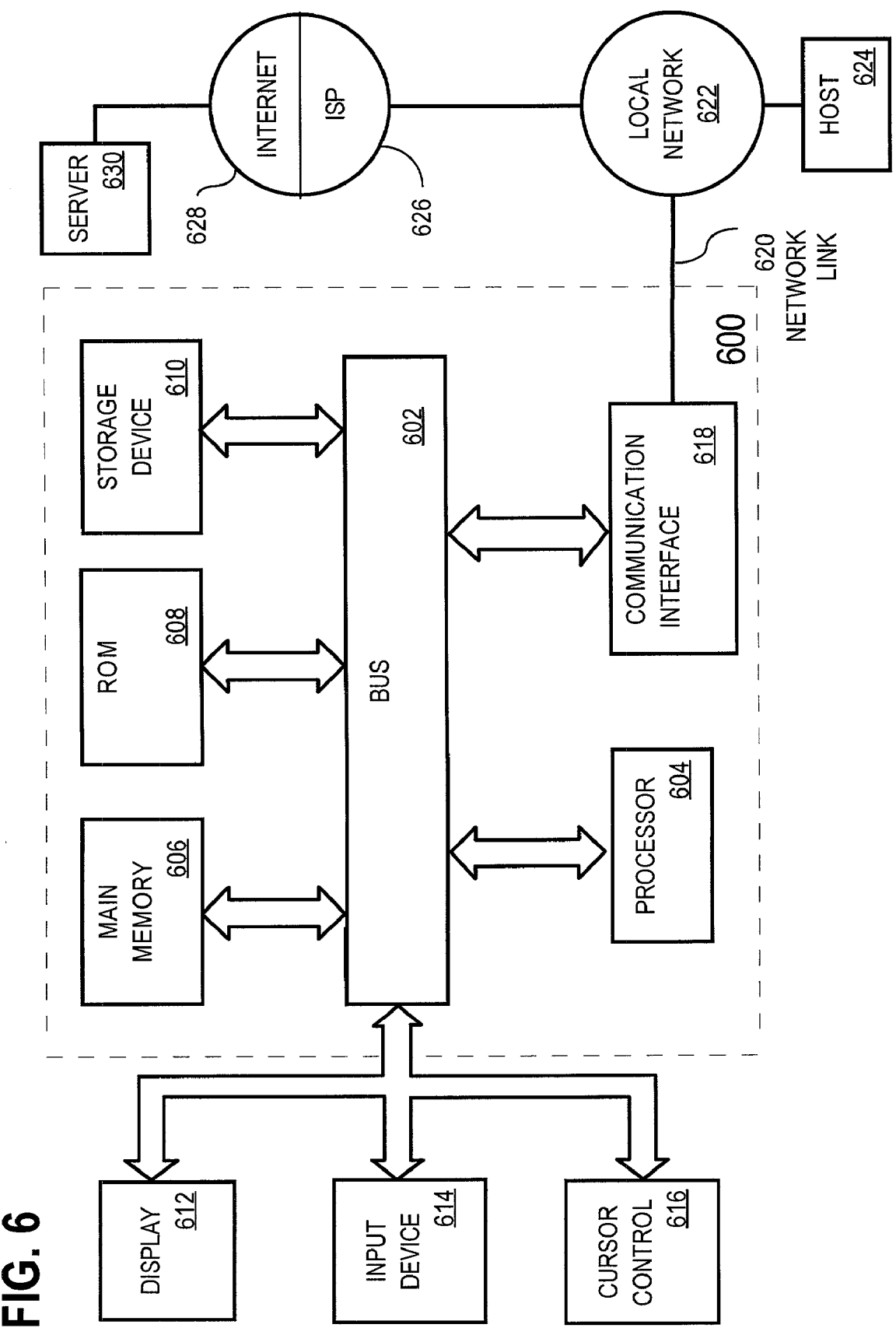
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for encrypting data that is communicated between a client and a server that uses hypertext transfer protocol for application-layer communications. According to one embodiment of the invention, encrypting data that is communicated between a client and a server that uses hypertext transfer protocol for application-layer communications is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for encrypting data that is communicated between a client and a server that uses hypertext transfer protocol for application-layer communications as described herein.

The received code may be executed by processor 604 as it is received, and/or stored in storage device 610, or other non-volatile storage for later execution. In this manner, computer system 600 may obtain application code in the form of a carrier wave.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for securing data in communications between a client and server using an unencrypted transfer protocol that does not encrypt a payload defined by the transfer protocol, the method comprising the computer-implemented steps of:

selecting a subset of data for encryption from a set of data to be communicated between the client and the server in a particular payload of the unencrypted transfer protocol;

determining a secret integer that is unique for the subset among a plurality of subsets in a plurality of payloads, wherein the secret integer associated with the particular payload is unique relative to secret integers associated with other payloads of the plurality of payloads, wherein determining the secret integer comprises:

determining a shared secret key based on a first integer and a first public key associated with a receiving device of the client and the server; and selecting the secret integer based on the shared secret key;

encrypting the subset of data using at least the secret integer to generate encrypted data that is impractical for a device other than the client and the server to decrypt; and sending, from a sending device of the client and the server to the receiving device, in the particular payload, the encrypted data and clue information to determine, only at the client and the server, the secret integer for decrypting the encrypted data.

2. A method as recited in claim 1, wherein the unencrypted transfer protocol is Hypertext Transfer Protocol (HTTP).

3. A method as recited in claim 1, said step of determining a secret integer that is unique for the subset further comprising the steps of:

generating the first integer using a random number generator.

4. A method as recited in claim 3, said step of sending the information to determine the secret integer further comprising the steps of:

determining a second public key associated with the sending device based on the first integer; and including the second public key in the information to determine the secret integer.

5. A method as recited in claim 3, said step of sending the information to determine the secret integer further comprising the steps of:

determining a plurality of second public keys associated with the sending device based on the first integer, wherein each of the second public keys is associated with one of a plurality of subsets from the set of data; and including the plurality of second public keys in the information to determine the secret integer.

6. A method as recited in claim 3, said step of selecting the secret integer further comprising the step of applying a particular hash function to the shared secret key to generate the secret integer.

7. A method as recited in claim 3, said step of generating encrypted data further comprising the step of performing an exclusive or (XOR) operation between corresponding bits of the subset and the secret integer to generate the encrypted data.

8. A method as recited in claim 1, wherein:

said step of determining the secret integer further comprises the step of applying a particular hash function a plurality of times to the shared secret key shared with the receiving device; and said step of sending the information to determine the secret integer further comprises the step of storing, as part of the clue information, data that indicates a number of times the particular hash function has been applied.

9. A method as recited in claim 8, said step of determining the secret integer further comprising the steps of:

determining a second integer formed after the particular hash function is applied the number of times indicated in the information;

determining a third integer formed after the particular hash function is applied fewer times than the number of times indicated in the information; and performing an exclusive or (XOR) operation between corresponding bits of the second integer and the third integer.

10. A method as recited in claim 8, said step of determining the secret integer further comprising the steps of:

determining a second integer formed after the particular hash function is applied the number of times indicated in the information;

determining a third integer formed after a second hash function is applied for the number of times indicated in the information, wherein the second hash function is different from the particular hash function that is used to determine the second integer; and performing an exclusive or (XOR) operation between corresponding bits of the second integer and the third integer.

11. A method as recited in claim 8, wherein determining the shared secret key is based on a particular communication between the client and the server; and further comprising storing the shared secret key in a secure data structure.

12. A method as recited in claim 1, wherein the secret integer has a particular number of bits fixed for all subsets in all payloads communicated during a communication session between the client and the server.

13. A method as recited in claim 1, wherein the secret integer has a number of bits that varies in accordance with lengths of payloads that are communicated during a communication session between the client and the server.

14. A computer-readable storage medium storing one or more sequences of instructions for securing data in communications between a client and server using an unencrypted transfer protocol that does not encrypt a payload defined by the transport protocol, which instructions, when executed by one or more processor, cause the one or more processor to carry out the steps of:

selecting a subset of data for encryption from a set of data to be communicated between the client and the server in a particular payload of the unencrypted transfer protocol;

determining a secret integer that is unique for the subset among a plurality of subsets in a plurality of payloads, wherein the secret integer associated with the particular payload is unique relative to secret integers associated with other payloads of the plurality of payloads, wherein determining the secret integer comprising:

determining a shared secret key based on a first integer and a first public key associated with a receiving device of the client and the server; and selecting the secret integer based on the shared secret key;

encrypting the subset of data using at least the secret integer to generate encrypted data that is practically unintelligible to a device other than the client and server; and sending, from a sending device of the client and the server to the receiving device, in the particular payload, the encrypted data and information to determine, only at the client and the server, the secret integer for decrypting the encrypted data.

15. An apparatus for securing data in communications between a client and server using an unencrypted transfer protocol that does not encrypt a payload defined by the transport protocol, comprising:

means for selecting a subset of data for encryption from a set of data to be communicated between the client and the server in a particular payload of the unencrypted transfer protocol;

means for determining a shared secret key based on a first integer and a first public key associated with a receiving device of the client and the server;

means for determining a secret integer that is unique for the subset among a plurality of subsets in a plurality of payloads, wherein the secret integer associated with the particular payload is unique relative to secret integers associated with other payloads of the plurality of payloads, wherein the means for determining the secret integer comprise means for selecting the secret integer based on the shared secret key;

means for encrypting the subset of data using at least the secret integer to generate, encrypted data that is practically unintelligible to a device other than the client and the server; and means for sending to the receiving device, in the particular payload, the encrypted data and information to determine, only at the client and the server, the secret integer for decrypting the encrypted data.

16. The apparatus of claim 15, wherein the unencrypted transfer protocol is Hypertext Transfer Protocol (HTTP).

17. The apparatus of claim 15, wherein the means for determining a generating the first integer using a random number generator.

18. The apparatus of claim 17, wherein the means for sending the information to determine the secret integer comprises means for:

determining a second public key associated with the sending device based on the first integer; and including the second public key in the information to determine the secret integer.

19. The apparatus of claim 17, wherein the means for sending the information to determine the secret integer comprises means for:

determining a plurality of second public keys associated with the sending device based on the first integer, wherein each of the second public keys is associated with one of a plurality of subsets from the set of data; and including the plurality of second public keys in the information to determine the secret integer.

20. The apparatus of claim 17, wherein the means for selecting the secret integer comprises means for applying a particular hash function to the shared secret key to generate the secret integer.

21. The apparatus of claim 17, wherein the means for generating encrypted data comprises means for performing an exclusive or (XOR) operation between corresponding bits of the subset and the secret integer to generate the encrypted data.

22. The apparatus of claim 15, wherein the means for determining the secret integer comprises means for applying a particular hash function a plurality of times to the shared secret key shared with the receiving device; and wherein the means for sending the information to determine the secret integer comprise comprises means for storing, as part of the clue information, data that indicates a number of times the particular hash function has been applied.

23. The apparatus of claim 22, wherein the means for determining the secret integer comprises means for:

determining a second integer formed after the particular hash function is applied the number of times indicated in the information;

determining a third integer formed after the particular hash function is applied fewer times than the number of times indicated in the information; and performing an exclusive or (XOR) operation between corresponding bits of the second integer and the third integer.

24. The apparatus of claim 22, wherein the means for determining the secret integer comprises means for:

determining a second integer formed after the particular hash function is applied the number of times indicated in the information;

determining a third integer formed after a second hash function is applied for the number of times indicated in the information, wherein the second hash function is different from the particular hash function that is used to determine the second integer; and performing an exclusive or (XOR) operation between corresponding bits of the second integer and the third integer.

25. The apparatus of claim 22, further comprising means for:

determining the shared secret key based on a particular communication between the client and the server; and storing the shared secret key in a secure data structure.

26. The apparatus of claim 15, wherein the secret integer has a particular number of bits fixed for all subsets in all payloads communicated during a communication session between the client and the server.

27. The apparatus of claim 15, wherein the secret integer has a number of bits that varies in accordance with lengths of payloads that are communicated during a communication session between the client and the server.

28. An apparatus for securing data in communications between a client and server using an unencrypted transfer protocol that does not encrypt a payload defined by the transport protocol, comprising:

a network interface that is coupled to the data network for sending one or more packet flows thereto;

a processor;

one or more stored sequences of instructions which, when executed by the processor, cause the processor to carry out the steps of:

selecting a subset of data for encryption from a set of data to be communicated between the client and the server in a particular payload of the unencrypted transfer protocol;

determining a secret integer that is unique for the subset among a plurality of subsets in a plurality of payloads, wherein the secret integer associated with the particular payload is unique relative to secret integers associated with other payloads of the plurality of payloads, wherein determining the secret integer comprises:

determining a shared secret key based on a first integer and a first public key associated with a receiving device of the client and the server; and selecting the secret integer based on the shared secret key;

encrypting the subset of data using at least the secret integer to generate encrypted data that is practically unintelligible to a device other than the client and the server; and sending, to the receiving device, in the particular payload, the encrypted data and information to determine, only at the client and the server, the secret integer for decrypting the encrypted data.

29. The apparatus of claim 28, wherein the unencrypted transfer protocol is Hypertext Transfer Protocol (HTTP).

30. The apparatus of claim 28, wherein the sequences of instructions that cause the processor to perform determining a secret integer that is unique for the subset comprise sequences of instructions which, when executed by the processor, cause the processor to perform:

generating the first integer using a random number generator.

31. The apparatus of claim 30, wherein the sequences of instructions that cause the processor to perform sending the information to determine the secret integer comprise sequences of instructions which, when executed by the processor, cause the processor to perform:

determining a second public key associated with the sending device based on the first integer; and including the second public key in the information to determine the secret integer.

32. The apparatus of claim 30, wherein the sequences of instructions that cause the processor to perform sending the information to determine the secret integer comprise sequences of instructions which, when executed by the processor, cause the processor to perform:

determining a plurality of second public keys associated with the sending device based on the first integer, wherein each of the second public keys is associated with one of a plurality of subsets from the set of data; and including the plurality of second public keys in the information to determine the secret integer.

33. The apparatus of claim 30, wherein the sequences of instructions that cause the processor to perform selecting the secret integer comprise sequences of instructions which, when executed by the processor, cause the processor to perform applying a particular hash function to the shared secret key to generate the secret integer.

34. The apparatus of claim 30, wherein the sequences of instructions that cause the processor to perform generating encrypted data comprise sequences of instructions which, when executed by the processor, cause the processor to perform an exclusive or (XOR) operation between corresponding bits of the subset and the secret integer to generate the encrypted data.

35. The apparatus of claim 28, wherein the sequences of instructions that cause the processor to perform determining the secret integer comprise sequences of instructions which, when executed by the processor, cause the processor to perform applying a particular hash function a plurality of times to the shared secret key shared with the receiving device; and wherein the sequences of instructions that cause the processor to perform sending the information to determine the secret integer comprise sequences of instructions which, when executed by the processor, cause the processor to perform storing, as part of the clue information, data that indicates a number of times the particular hash function has been applied.

36. The apparatus of claim 35, wherein the sequences of instructions that cause the processor to perform determining the secret integer comprise sequences of instructions which, when executed by the processor, cause the processor to perform:

determining a second integer formed after the particular hash function is applied the number of times indicated in the information;

determining a third integer formed after the particular hash function is applied fewer times than the number of times indicated in the information; and performing an exclusive or (XOR) operation between corresponding bits of the second integer and the third integer.

37. The apparatus of claim 35, wherein the sequences of instructions that cause the processor to perform determining the secret integer comprise sequences of instructions which, when executed by the processor, cause the processor to perform:

determining a second integer formed after the particular hash function is applied the number of times indicated in the information;

determining a third integer formed after a second hash function is applied for the number of times indicated in the information, wherein the second hash function is different from the particular hash function that is used to determine the second integer; and performing an exclusive or (XOR) operation between corresponding bits of the second integer and the third integer.

38. The apparatus of claim 35, wherein the sequences of instructions that cause the processor to perform determining the shared secret key comprise sequences of instructions which, when executed by the processor, cause the processor to perform:

determining the shared secret key based on a particular communication between the client and the server, and further comprising sequences of instructions which, when executed by the processor, cause the processor to perform the steps of:

storing the shared secret key in a secure data structure.

39. The apparatus of claim 28, wherein the secret integer has a particular number of bits fixed for all subsets in all payloads communicated during a communication session between the client and the server.

40. The apparatus of claim 28, wherein the secret integer has a number of bits that varies in accordance with lengths of payloads that are communicated during a communication session between the client and the server.

* * * * *

UNITED STATES PATENT AND TRADEMARK OFFICE
CERTIFICATE OF CORRECTION

PATENT NO. : 7,194,621 B1  
APPLICATION NO. : 10/086516  
DATED : March 20, 2007  
INVENTOR(S) : Khanh V. Nguyen et al.

Page 1 of 1

It is certified that error appears in the above-identified patent and that said Letters Patent is hereby corrected as shown below:

Col. 20, line 50, after "one or more" (first occurrence) delete "processor" and insert --processors--

Col. 20, line 50, after "one or more" (second occurrence) delete "processor" and insert --processors--

Col. 22, line 6, after "integer" delete --comprise--

Signed and Sealed this

Nineteenth Day of June, 2007

JON W. DUDAS  
*Director of the United States Patent and Trademark Office*